United States Patent
Ishikura et al.

(10) Patent No.: US 7,742,285 B2
(45) Date of Patent: Jun. 22, 2010

(54) FOLDING PORTABLE TERMINAL

(75) Inventors: Katsutoshi Ishikura, Sakura (JP); Waho Oh, Chiba (JP); Masao Miyazaki, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1063 days.

(21) Appl. No.: 10/580,269

(22) PCT Filed: Oct. 21, 2004

(86) PCT No.: PCT/JP2004/015601

§ 371 (c)(1),
(2), (4) Date: May 25, 2006

(87) PCT Pub. No.: WO2005/053288

PCT Pub. Date: Jun. 9, 2005

(65) Prior Publication Data

US 2009/0005130 A1    Jan. 1, 2009

(30) Foreign Application Priority Data

Nov. 26, 2003 (JP) .............................. 2003-395112

(51) Int. Cl.
*G06F 1/16* (2006.01)

(52) U.S. Cl. .............................. 361/679.01; 455/575.1; 345/157; 16/346; 248/398

(58) Field of Classification Search ............. 455/575.1, 455/575.3, 556.1; 361/679.01, 679.05, 679.07, 361/679.09, 679.27, 679.55; 345/1.3, 157, 345/169, 173; 385/40, 130; 348/340, 344, 348/14.02; 16/337, 308, 280, 346; 248/124.1, 248/398

See application file for complete search history.

(56) References Cited

U.S. PATENT DOCUMENTS 5,268,817 A * 12/1993 Miyagawa et al. ..... 361/679.07

(Continued)

FOREIGN PATENT DOCUMENTS

JP      3-278212 A     12/1991

(Continued)

*Primary Examiner*—Hung V Duong
(74) *Attorney, Agent, or Firm*—Birch, Stewart, Kolasch & Birch LLP (57) ABSTRACT

A folding portable terminal which can be changed into a desired shape depending on applications of functions such as a telephone, a digital camera, and the like. A folding portable terminal (1) comprises a case (10) with a display section (11) and a case (20) with an operating section (21), and the cases are foldably linked through a hinge mechanism. The hinge mechanism comprises a first hinge section (12) formed by providing a first rotation axis at substantially the center of the case (10) that can be rotated about the first rotation axis in the folding or opening direction relative to the case (20); a second hinge section (24) formed by providing a second rotation axis at substantially the upper end part of the case (20) so as to be parallel to the first rotation axis, the case (20) being rotated in the folding or opening direction relative to the case (10); and means (13*a*) for linking both ends of the first rotation axis and both ends of the second rotation axis. The hinge mechanism enables the display section (11) and the operating section (21) to be folded without being faced each other, and a user can operate the operating section (21) or view the display section (11) in the folded state.

7 Claims, 8 Drawing Sheets

U.S. PATENT DOCUMENTS

| | | | |
|---|---|---|---|
| 6,392,877 B1 * | 5/2002 | Iredale | 361/679.05 |
| 6,879,337 B2 | 4/2005 | Tatehana et al. | |
| 2003/0044001 A1 | 3/2003 | Kim | |
| 2006/0211457 A1 * | 9/2006 | Otsuka | 455/575.1 |

FOREIGN PATENT DOCUMENTS

| | | |
|---|---|---|
| JP | 6-187068 A | 7/1994 |
| JP | 2002-111834 A | 4/2002 |
| JP | 2002-171324 A | 6/2002 |
| JP | 2002-198849 A | 7/2002 |
| JP | 2002-218034 A | 8/2002 |
| JP | 2002-305565 A | 10/2002 |
| JP | 2002-344591 A | 11/2002 |
| JP | 2002-359678 A | 12/2002 |
| JP | 2003-218998 A | 7/2003 |
| JP | 2003-249986 A | 9/2003 |
| JP | 2003-283617 A | 10/2003 |
| JP | 2003-324512 A | 11/2003 |
| KR | 2003-0021564 A | 3/2003 |

* cited by examiner

FOLDING PORTABLE TERMINAL

TECHNICAL FIELD

The present invention relates generally to a folding portable terminal, and, more particularly, to a folding portable terminal that can take various shapes and styles depending on usage situations.

BACKGROUND OF THE INVENTION

Currently, folding portable terminals with various configurations are widely used. A typical folding portable terminal can be closed such that a display section and an operating section are hidden inside when not used and is opened and used when making phone calls or utilizing e-mail. In this case, since the display section is hidden when closed, many folding portable terminals are equipped with a sub-display section such that incoming call information or a time of day can be checked in the closed state. To use a videophone function in a folding portable terminal, many folding portable terminals are equipped with sub-cameras within case in addition to main cameras for shooting pictures or videos provided on the outside of the case. To eliminate the use of the sub-display section, some folding portable terminals are introduced which can be closed with the main display section faced outward.

However, with regard to the folding portable terminals provided with the sub-display sections, the reduction of the terminal size is prevented by the addition of the sub-display section, and costs are also increased. If the videophone function is utilized with this folding portable terminal, since a sub-camera must be provided on the inside of a case in addition to a main camera for photographing provided on the outside of the case, the reduction of the terminal size is prevented and costs are increased as well. In the case of a configuration with a main camera only, a rotation mechanism must be provided on the main camera such that the main camera faces outward or inward, and costs are increased as well. If the portable terminal is used as a television, a display screen must be made horizontal and this is unnatural for a style of watching television in the case of a normal folding portable terminal.

With regard to the folding portable terminals which can be closed with the main display section faced outward to eliminate the use of the sub-display section, since the operating section is folded inside, the portable terminal cannot be operated in the closed state. For example, a phone call cannot be made with the portable terminal closed, and the folding portable terminal must be opened to make a phone call or must be provided with a phone call button that can be operated in the closed state.

The following patent document 1 and patent document 2 disclose folding portable terminals that can be closed with both the display section and the operating section faced outward since a display section case provided with the display section can be opened 360 degrees relative to an operating section case provided with the operating section.

Patent Document 1: Japanese Laid-Open Patent Publication No. 2002-171324

Patent Document 2: Japanese Laid-Open Patent Publication No. 2002-198849

DISCLOSURE OF THE INVENTION

Problem to be Solved by the Invention

However, while the folding portable terminals of patent document 1 and patent document 2 described above can be closed with both the display section and the operating section faced outward since the operating section case and the display section case can be opened 360 degrees relative to each other, the folding portable terminals cannot be closed with the operating section faced inward and the display section faced outward. Therefore, when a user carries the folding portable terminal with the display section faced outward, the outside operating section may be operated accidentally.

The present invention was conceived in view of the above current conditions and it is therefore an object of the present invention to provide a folding portable terminal with an operating section case provided with an operating section and a display section case provided with a display section linked foldably by a hinge mechanism, and the folding portable terminal has a folding configuration that enables the operating section to be operated and the display section to be viewed when folded and can be changed to a desired shape depending on situations of the use of various functions such as a telephone, e-mail, videophone, television, and digital camera due to the folding configuration.

Means for Solving the Problem

In order to solve the above problem, a first technical means is a folding portable terminal having an operating section case with an operating section and a display section case with a display section that are foldably linked by a hinge mechanism, the hinge mechanism comprising: a first hinge section that disposes in an approximately center portion of the display section case a first rotation axis for rotating the display section case in the folding or opening direction relative to the operating section case; a second hinge section that disposes in an approximately upper end portion of the operating section case a second rotation axis for rotating the operating section case in the folding or opening direction relative to the display section case in parallel with the first rotation axis; and linking means for linking both ends of the first rotation axis and both ends of the second rotation axis, respectively, the folding portable terminal being able to be folded by the hinge mechanism such that the display section is not opposed to the operating section.

A second technical means is the folding portable terminal of the first technical means, wherein either or both of the display section and the operating section can be faced outward when folded.

A third technical means is the folding portable terminal of the first or second technical means, wherein the operating section case comprises imaging means on a surface provided with the operating section.

A fourth technical means is the folding portable terminal of the first or second technical means, wherein the operating section case comprises imaging means on a surface behind the surface provided with the operating section.

A fifth technical means is the folding portable terminal of the first or second technical means, wherein the operating section case comprises imaging means that can be rotated in the direction of folding or opening the display section case relative to the operating section case on an upper end portion.

A sixth technical means is the folding portable terminal of the first or second technical means, wherein the display section case comprises imaging means that can be rotated in the direction of folding or opening the display section case relative to the operating section case.

A seventh technical means are the folding portable terminal of the first or second technical means, comprising operating means for operating the folding portable terminal on a side face of the operating section case or the display section case.

Effect of the Invention

The present invention can provide a folding portable terminal with an operating section case provided with an operating section and a display section case provided with a display section linked foldably by a hinge mechanism, and the folding portable terminal has a folding configuration that enables the operating section to be operated and the display section to be viewed when folded and can be changed to a desired shape depending on situations of the use of various functions such as a telephone, e-mail, videophone, television, and digital camera due to the folding configuration.

EXPLANATIONS OF REFERENCE NUMERALS

1 . . . folding portable terminal; 10 . . . display section case; 11 . . . display section; 12 . . . first hinge section; 12a, 12b . . . first hinge member; 13a, 13b . . . linking means; 20 . . . operating section case; 21 . . . operating section; 22, 25, 26 . . . camera; 23 . . . operating button; 24 . . . second hinge section; 24a, 24b . . . second hinge member; 30 . . . pedestal; 40a, 40b . . . cable; 41 . . . first rotation axis; and 42 . . . second rotation axis.

PREFERRED EMBODIMENTS OF THE INVENTION

First Embodiment

Figure 1:
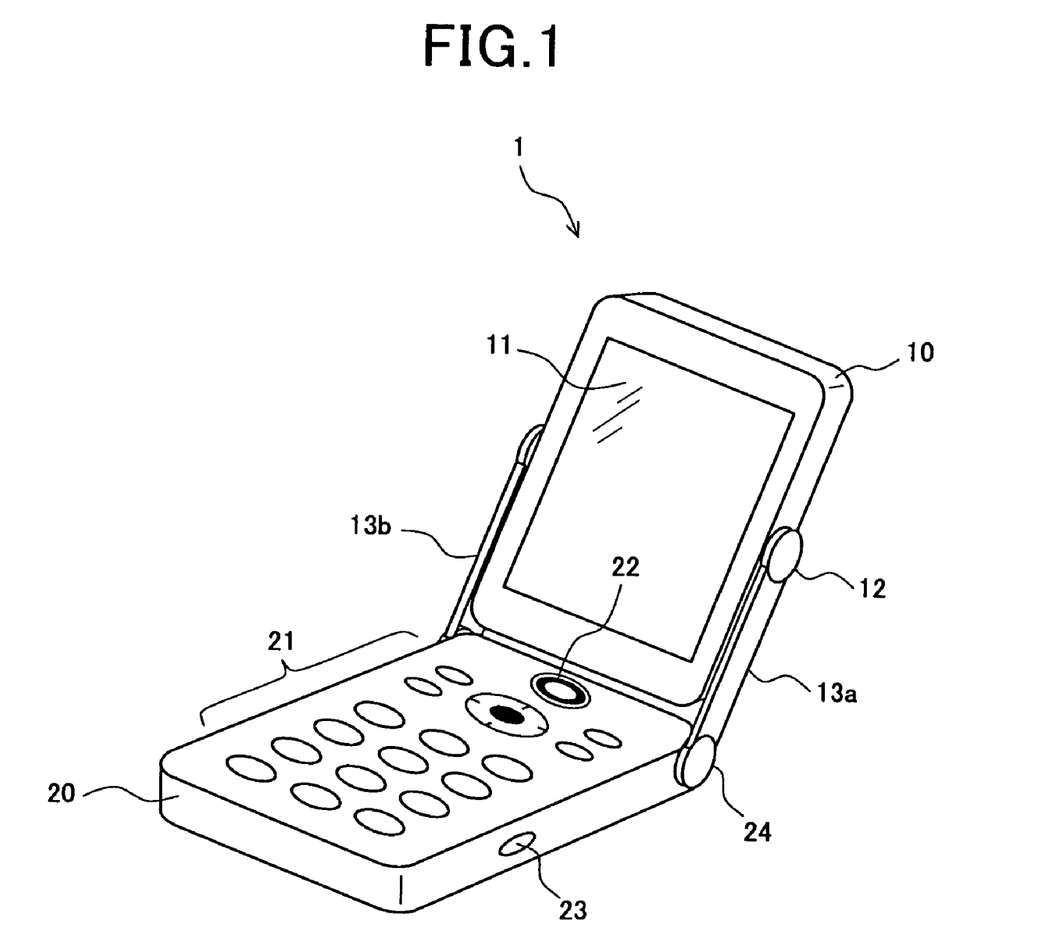
FIG. 1 is an outline view of a folding portable terminal according to a first embodiment of the present invention.

FIG. 1 is an outline view of a folding portable terminal according to a first embodiment of the present invention; in this figure, a numeral 1 is a folding portable terminal; and the folding portable terminal 1 includes a display section case 10 provided with a display section and an operating section case 20 provided with an operating section. The display section case 10 is a case that includes a display section 11 such as a liquid crystal display for displaying various pieces of information. The operating section case 20 is a case that includes an operating section 21 for performing various operations of the folding portable terminal 1. An approximately center portion of the display section case 10 is provided with a first hinge section 12 that rotates in the direction of folding or opening the display section case 10 relative to the operating section case 20, and an approximately upper end portion of the operating section case 20 is provided with a second hinge section 24 parallel to the first hinge section 12 in a rotatable manner. Both ends of the first hinge section 12 and the second hinge section 24 are linked by linking means 13a, 13b. The operating section case 20 is mounted with a camera 22 used for photographing, video shooting, and video phone calling, and the side face of the operating section case 20 is mounted with an operating button 23, such as a shutter button, used for a camera operation or other operations. Although a plurality of the operating buttons 23 can be mounted, the state of mounting only one button is shown as a representative example in this embodiment.

In another embodiment, an approximately lower end portion of the display section case 10 may be provided with the first hinge section 12 that rotates in the direction of folding or opening the display section case 10 relative to the operating section case 20, and an approximately center portion of the operating section case 20 may be provided with the second hinge section 24 parallel to the first hinge section 12 in a rotatable manner. In this case, both ends of the first hinge section 12 and the second hinge section 24 are linked by the linking means 13a, 13b as well.

Figure 2:
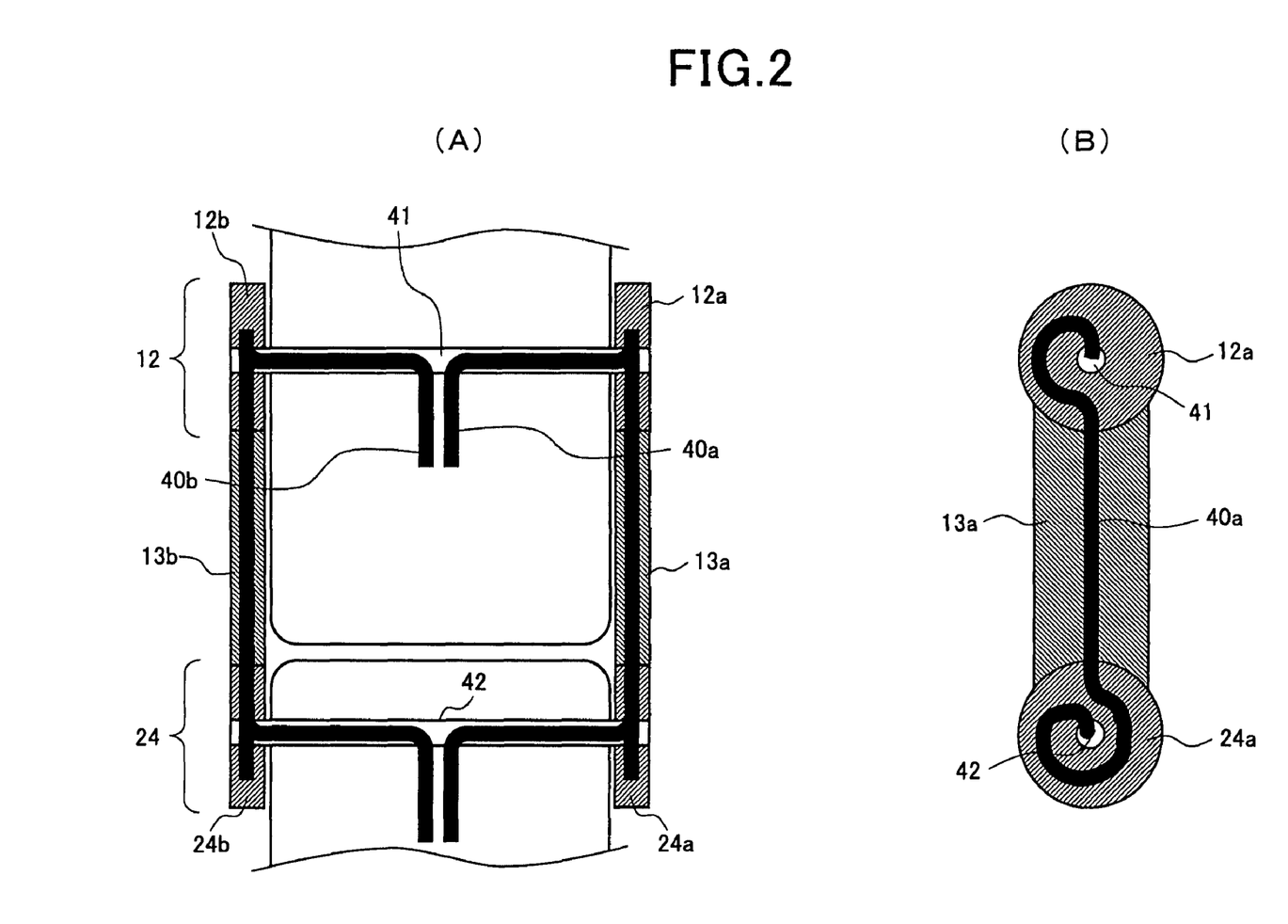
FIG. 2 is a cross-section view for describing a configuration of a first hinge section and a second hinge section provided in the folding portable terminal shown in FIG. 1.

FIG. 2 is a cross-sectional view for describing a configuration of the first hinge section 12 and the second hinge section 24 provided in the folding portable terminal 1 shown in FIG. 1. FIG. 2(A) is a cross-sectional view of the first hinge section 12 and the second hinge section 24 when the folding portable terminal 1 is viewed from the front side and FIG. 2(B) is a cross-sectional view of the first hinge section 12 and the second hinge section 24 when the folding portable terminal 1 is viewed from the lateral side.

In FIG. 2(A) and FIG. 2(B), the electric connection between the display section case 10 and the operating section case 20 is established by a cable 40a and a cable 40b. The first hinge section 12 is located in the approximately center portion of the display section case 10 and is constituted by a first hinge members 12a, 12b disposed symmetrically and a first rotation axis 41 as shown in FIG. 2(A).

As shown in FIG. 2(B), the cross section of the first hinge member 12a and the first rotation axis 41 is a doughnut shape and the cable 40a passes through the hole of the doughnut shape. Similarly, the cross section of the first hinge member 12b and the first rotation axis 41 is a doughnut shape and the cable 40b passes through the hole of the doughnut shape. Therefore, when rotated, only the first hinge members 12a, 12b and the first rotation axis 41 are rotated and the cables 40a and 40b are not rotated in this configuration. As described later, the first hinge section 12 is configured to be rotated about 180 degrees and as shown in FIG. 2(B), the cables 40a and 40b are slack at the periphery of the first hinge members 12a, 12b such that the rotation of about 180 degrees can be achieved.

As shown in FIG. 2(A), the second hinge section 24 is located in the approximately upper end portion of the operating section case 20 and is constituted by a second hinge members 24a, 24b disposed symmetrically and a second rotation axis 42. The configuration of the second hinge section 24 is the same as that of the first hinge section 12 described above. However, as described later, the second hinge section 24 is configured to be rotated about 360 degrees and as shown in FIG. 2(B), the cables 40a and 40b are more slack at the periphery of the second hinge members 24a, 24b than the first hinge members 12a, 12b such that the rotation of about 360 degrees can be achieved.

The first hinge section 12 disposed in the approximately center portion of the display section case 10 and the second hinge section 24 disposed in the approximately upper end portion of the operating section case 20 have a free-stop configuration that enables the folding portable terminal 1 to be kept and used at an arbitrary rotation angle by imposing resistance to the rotation of the hinge to some extent. However, to keep the rotation angles depending on frequently used shapes and styles, stopper members may be provided for each rotation angle such that the rotation angles are kept for the shapes and styles.

Figure 3:
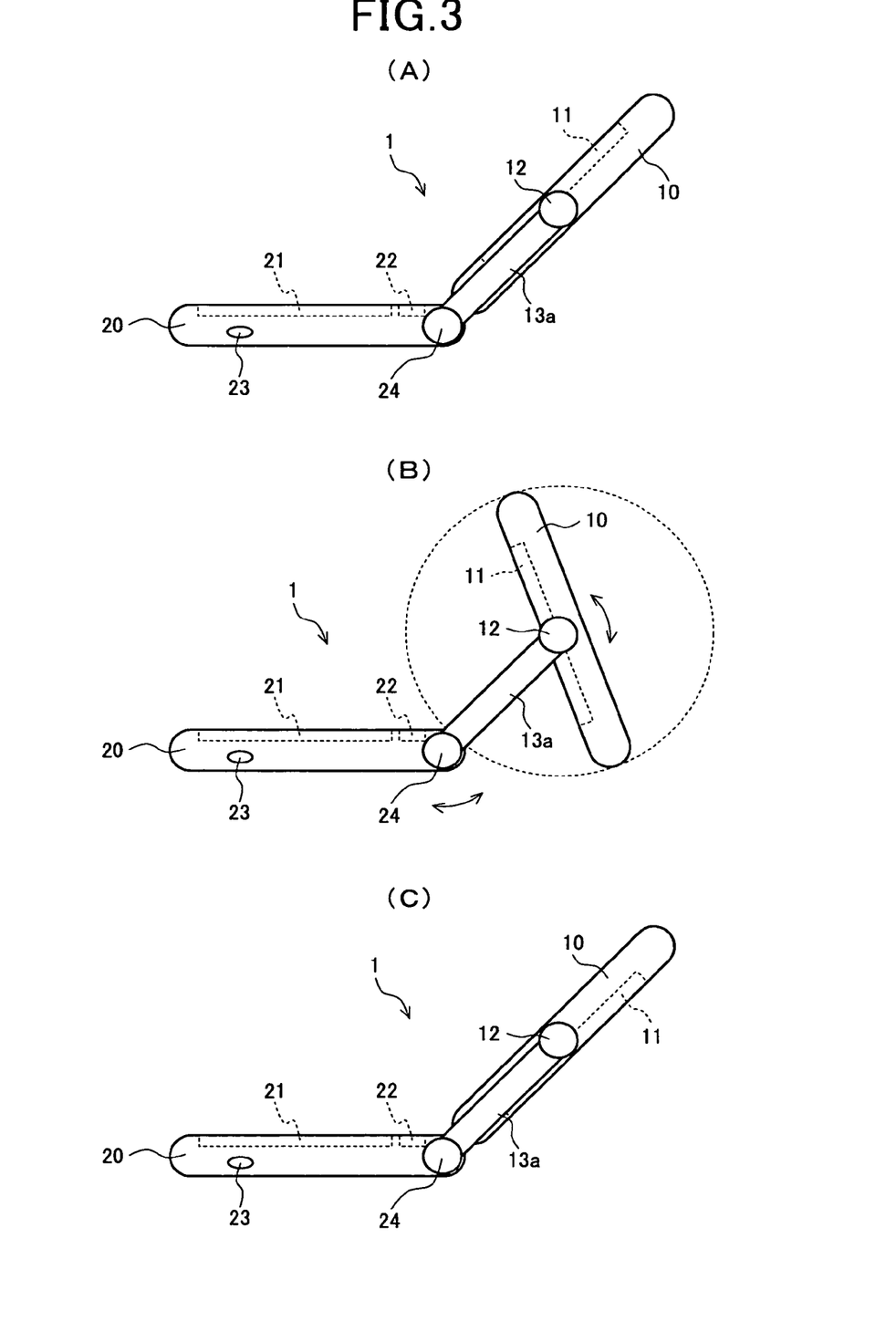
FIG. 3 is an outline view of the folding portable terminal shown in FIG. 1 in an opened state from a lateral view.

FIG. 3(A) to FIG. 3(C) are outline views of the folding portable terminal 1 shown in FIG. 1 in an opened state from a lateral view. At the time of normal use, such as when using a telephone and e-mail or browsing web sites, the display section case 10 and the operating section case 20 are used in a style of opening relative to each other as shown in FIG. 3(A). Since the camera 22 is mounted to the operating section case 20, the folding portable terminal 1 of the present embodiment can be used in the style shown in FIG. 3(A) when a user holds the terminal to photograph oneself or make a videophone call. In this case, the camera 22 may be mounted to the display section case 10.

As shown in FIG. 3(B), the display section case 10 can be rotated around the first hinge section 12 attached to the approximately center portion of the case. Since the first hinge section 12 can be rotated about 180 degrees from a state shown in FIG. 3(A) to a state shown in FIG. 3(C) in this embodiment, the display section 11 can be reversed. Therefore, when the user photographs other than oneself, for example, the display section 11 may be reversed and used as shown in FIG. 3(C). In this case, to prevent the image on the display section 11 from being inverted vertically, when the display section 11 is reversed, the image on the display section 11 is controlled to be inverted automatically. For example, the folding portable terminal 1 may comprise a rotation angle sensor (not shown) and the image on the display section 11 may be inverted vertically by detecting the rotation angle of the first hinge section 12 with this rotation angle sensor.

Figure 4:
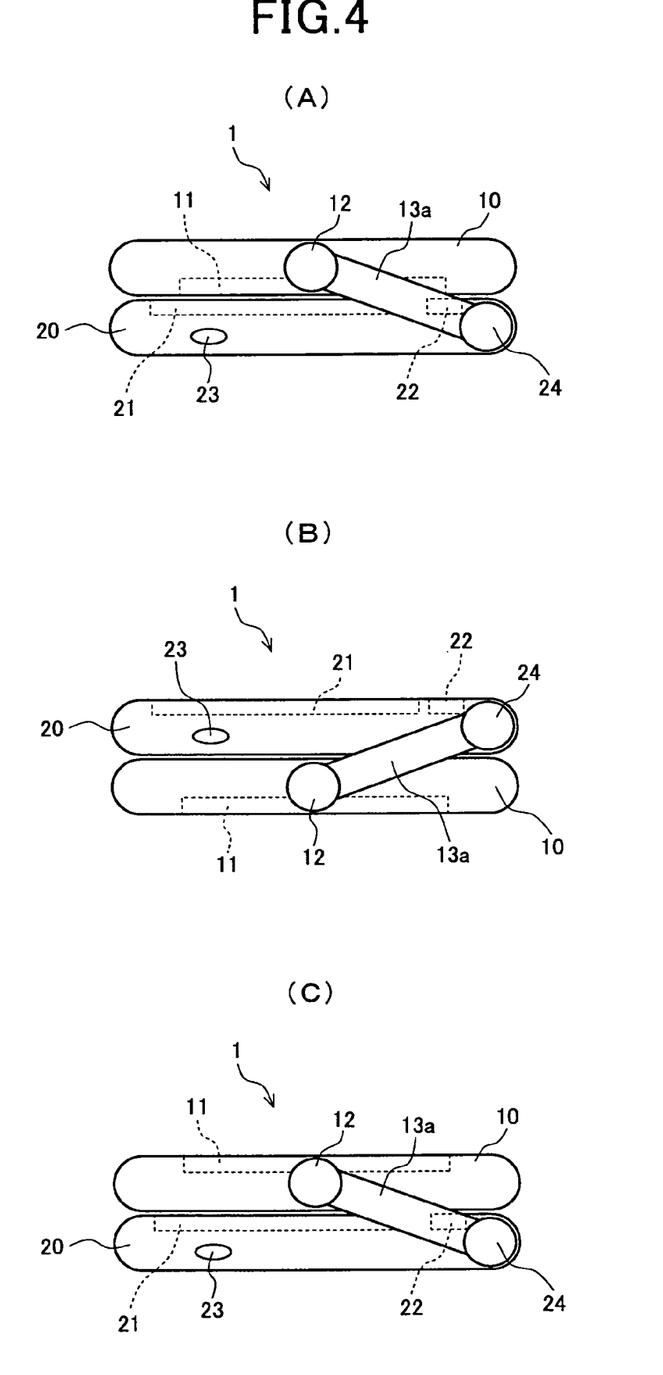
FIG. 4 is an outline view of the folding portable terminal shown in FIG. 1 in a closed state from a lateral view.

Since the second hinge section 24 can be rotated about 360 degrees as described above, a closed state with the display section 11 and the operating section 21 faced inward can be changed to an opened 360 degrees state, that is, to a closed state with the display section 11 and the operating section 21 faced outward. Therefore, when the user photographs other than oneself, the user can also use this digital camera style opened 360 degrees. This will be described in detail with reference to FIG. 4 later. When photographing in the state shown in FIG. 3(A) or FIG. 3(C), the operating button 23 or the operating section 21 is used for the camera operation such as the operation of the shutter button used at the time of photographing.

FIG. 4(A) to FIG. 4(C) are outline views of the folding portable terminal 1 shown in FIG. 1 in a closed state from a lateral view. When not in normal use, as shown in FIG. 4(A), the folding portable terminal 1 may be closed with the display section 11, the operating section 21, and the camera 22 faced inward. By closing in this way, the display section 11 and the camera 22 will not be damaged or the operating section 21 will not be pushed accidentally when the folding portable terminal 1 is carried about by a user.

If incoming call information, time information, etc. are desired to be checked without opening the folding portable terminal 1, the display section 11 may be reversed and closed as shown in FIG. 4(C). Such a configuration can be substituted for a sub liquid crystal screen provided on a conventional folding portable terminal. Since the screen size of the display section 11 is typically large, when the display section 11 is used as a substitute for the sub liquid crystal screen, power consumption can be reduced if a portion of the display area of the display section 11 is used for display. If a television function is added to the folding portable terminal 1, as shown in FIG. 4(C), the display section 11 can be reversed and closed to watch television in a style of making the display section 11 horizontal. Television can be watched in the closed state, i.e., in a compact style. For operations such as channel switching, the operating button 23 can be used.

When the digital camera style is desired, as shown in FIG. 4(B), the folding portable terminal 1 is closed with both the display section 11 and the operating section 21 (and camera 22) faced outward. In other words, from the state shown in FIG. 4(A), the folding portable terminal 1 can be used in a style of the display section 11 opened 360 degrees. In this way, the incoming image from the camera 22 can be directly displayed on the display section 11 and the folding portable terminal 1 can be used in the digital camera style. The operating button 23 may be used for the camera operations such as the operation of the shutter button. The operating section 21 faced outward can also be used for the camera operations.

Television can be watched also in the style shown in FIG. 4(B), and since the operating section 21 is exposed to the outside in this style, the operating section 21 can be used for television operations. However, since the operating buttons of the operating section 21 may be pushed accidentally, the style shown in FIG. 4(B) or FIG. 4(c) may be used depending on the situation when only the television is watched.

When closed in the style shown in FIG. 4(B), since the operating section 21 is always exposed to the outside, various operations can be performed in this state. For example, an incoming call can be received or a phone call can be made in the closed state without the need to open the folding portable terminal 1. The folding portable terminal 1 can be put on a pedestal in a style shown in FIG. 8(A) described later in a third embodiment to watch television or to utilize as a table clock.

Second Embodiment

Figure 5:
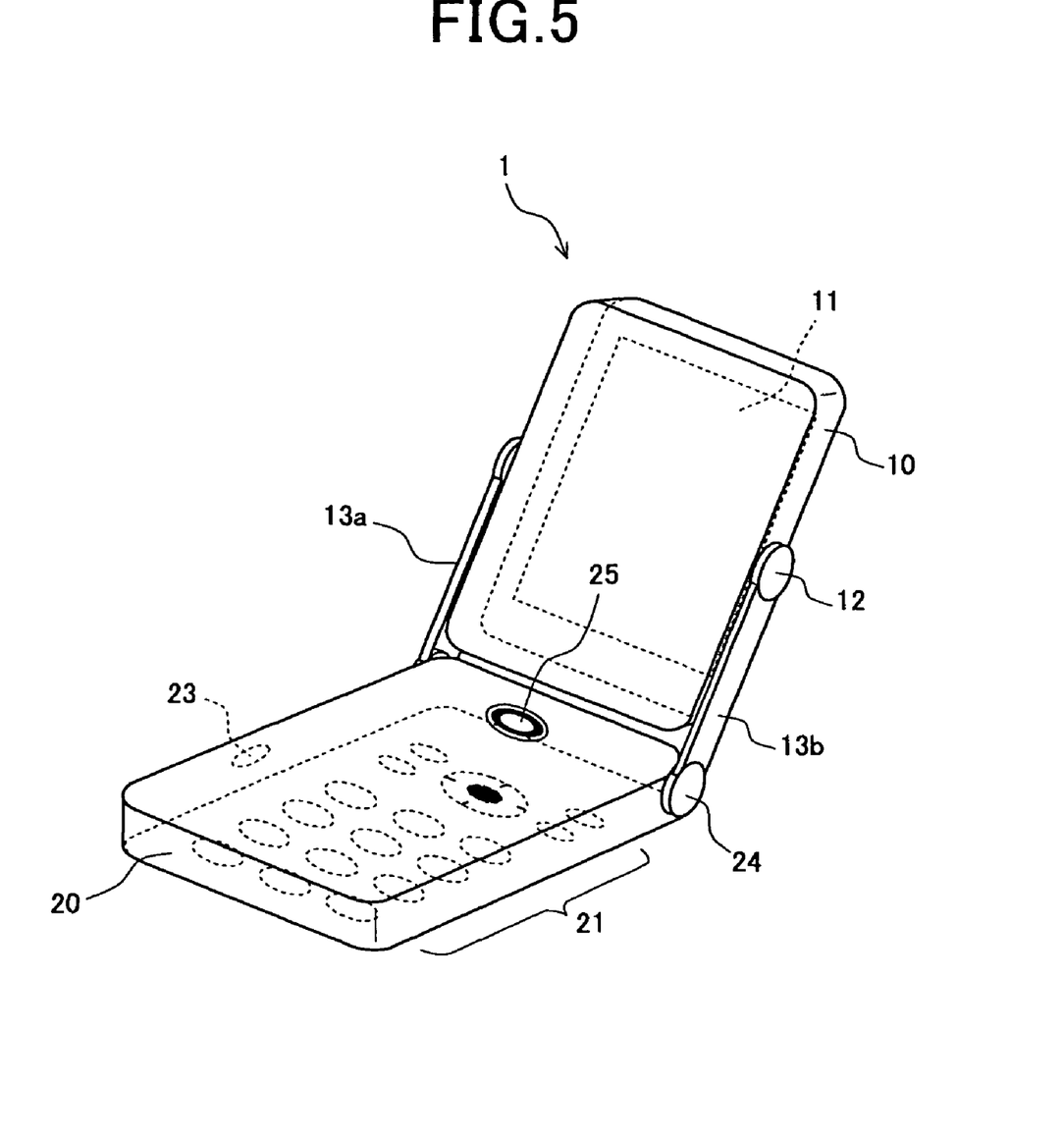
FIG. 5 is an outline view of a folding portable terminal according to a second embodiment of the present invention.

FIG. 5 is an outline view of a folding portable terminal 1 according to a second embodiment of the present invention. A difference with the configuration of the folding portable terminal 1 of the first embodiment is that a camera 25 is attached to a surface opposite to the operating section 21 of the operating section case 20 and the rest of the configuration is the same as that of the folding portable terminal 1 of the first embodiment.

Figure 6:
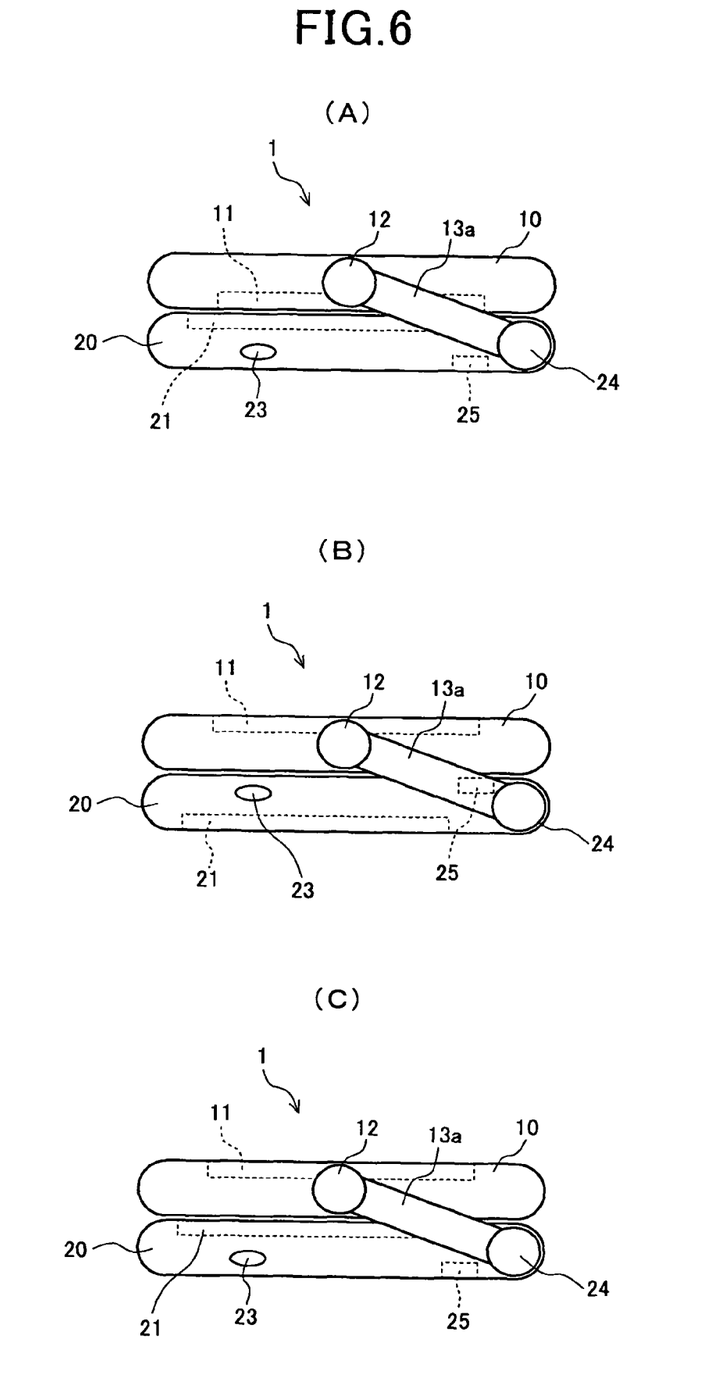
FIG. 6 is an outline view of the folding portable terminal shown in FIG. 5 in a closed state from a lateral view.

FIG. 6(A) to FIG. 6(C) are outline views of the folding portable terminal 1 shown in FIG. 5 in a closed state from a lateral view. Since the position of the camera 25 is different from the folding portable terminal 1 of the first embodiment, a form of usage is different when the camera is used. In this embodiment, when used in the digital camera style, as shown in FIG. 6(C), the folding portable terminal 1 is closed with the display section 11 faced outward and the operating section 21 faced inward. In this way, the incoming image from the camera 25 can be directly displayed on the display section 11 and the folding portable terminal 1 can be used in the digital camera style. The operating button 23 may be used for the camera operations such as the operation of the shutter button as is the case with the first embodiment. In this embodiment, the unnecessary operating section 21 is hidden inside to give consideration to an inexperienced user such that ambiguity of operations is eliminated.

When a user holds the terminal to photograph oneself or make a videophone call, the display section case 10 is opened from the closed state to a rotation angle of about 180 degrees relative to the operating section case 20 and the folding portable terminal 1 is used in a style of reversing the display section 11 to the opposite side of the operating section 21. In this way, while facing the camera 25 to the user, the image can be checked on the display section 11 at the same time, and a videophone call can be performed. As is the case with the first embodiment, to prevent the image on the display section 11 from being inverted vertically, when the display section 11 is reversed, the image on the display section 11 is controlled to be inverted automatically. Other than using the camera 25, the usage styles are the same as the first embodiment.

Third Embodiment

Figure 7:
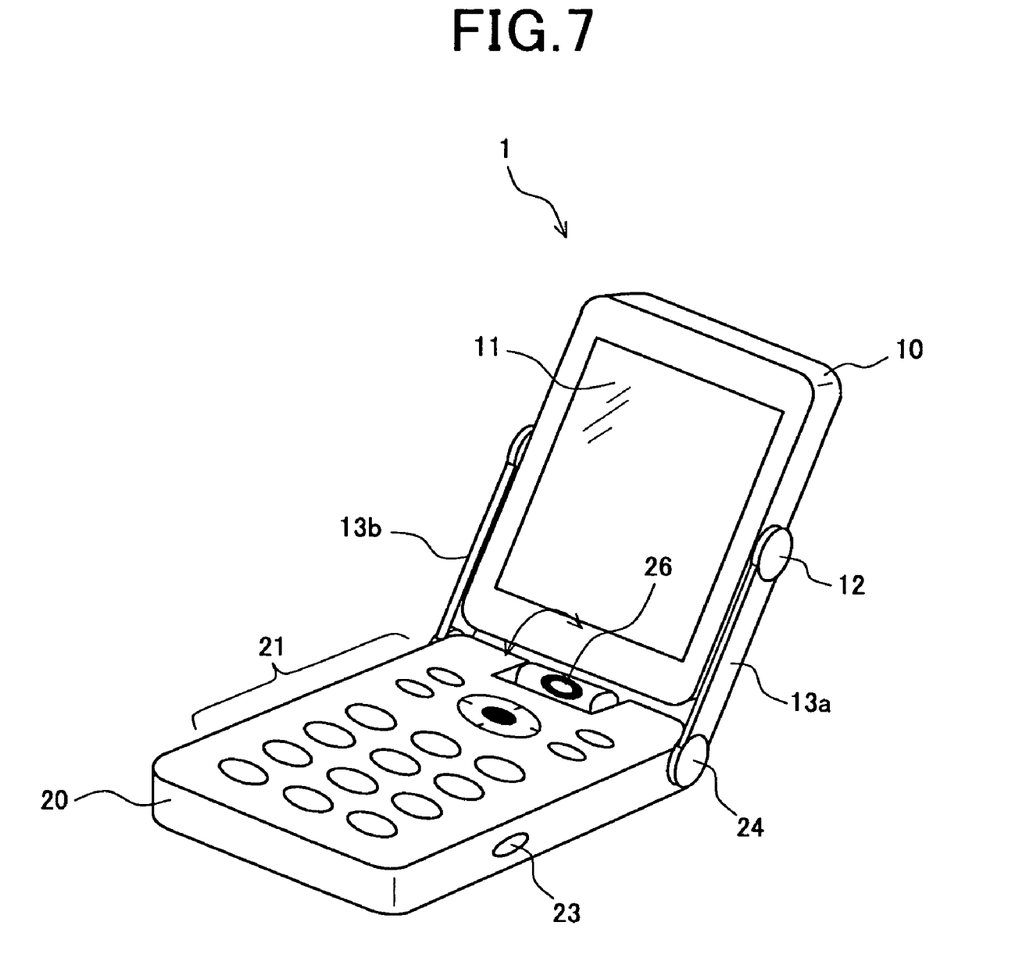
FIG. 7 is an outline view of a folding portable terminal according to a third embodiment of the present invention.

FIG. 7 is an outline view of a folding portable terminal 1 according to a third embodiment of the present invention. A difference with the folding portable terminals 1 of the first embodiment and the second embodiment is that a camera 26 having a rotation axis parallel to the second rotation axis of the second hinge section 24 is mounted to the upper end potion of the operating section case 20. The camera 26 can be rotated about 180 degrees around the rotation axis. The rest of the configuration is the same as that of the folding portable terminals 1 of the first embodiment and the second embodiment. The camera 26 may be mounted to the display section case 10.

Since the camera 26 can be rotated, the camera 26 can be turned to the direction of the operating section 21 or the opposite direction of the operating section 21 of the operating section case 20. Therefore, when the camera 26 is turned to the direction of the operating section 21, the folding portable terminal 1 can be used in the same style as the folding portable terminal 1 shown in the first embodiment, and when the camera 26 is turned to the opposite direction of the operating section 21, the folding portable terminal 1 can be used in the same style as the folding portable terminal 1 shown in the second embodiment. By holding the rotation angle of the camera 26 at various positions, the folding portable terminal 1 can be used in various styles.

Figure 8:
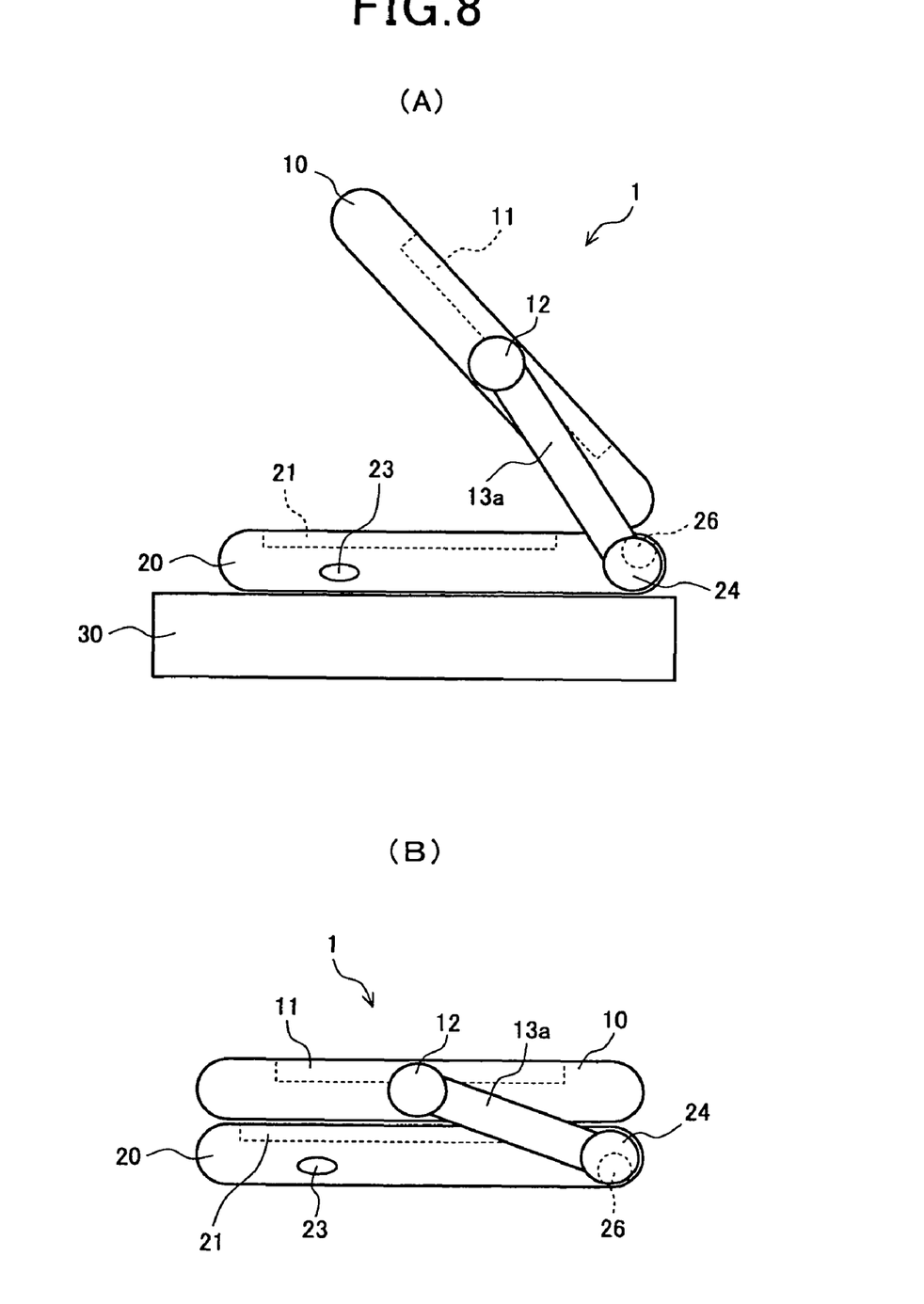
FIG. 8 is a diagram of an example of usage styles of the folding portable terminal.

FIG. 8(A) and FIG. 8(B) are diagrams of an example of usage styles of the folding portable terminal 1. FIG. 8(A) is a diagram of a style when the folding portable terminal 1 is put on a pedestal 30 to make a videophone call, etc., instead of holding the terminal. When the folding portable terminal 1 is put on a pedestal 30 to make a videophone call, the operating section case 20 provided with the camera 26 is put on the pedestal 30, and a user of the videophone is faced with the display section 11 and rotates the camera 26 appropriately to turn the camera 26 to the user. Since the display section 11 is reversed relative to the operating section 21 and is held at an arbitrary rotation angle as shown in FIG. 8(A), the image on the display section 11 is controlled to be inverted vertically as is the case with the folding portable terminal 1 shown in the first embodiment. Since the folding portable terminal 1 can be put on the pedestal 30 with the operating section 21 faced upward as shown in FIG. 8(A), the user can perform various operations during the videophone call while keeping the folding portable terminal 1 on the pedestal 30.

As shown in FIG. 8(A), the folding portable terminal 1 added with a television function may be used as compact table television. Further, the folding portable terminal 1 may be used as a table clock, etc.

FIG. 8(B) shows an example of using the folding portable terminal 1 with the operating section 21 folded inward in the digital camera style. Although this embodiment shows the style of folding the operating section 21 inward, a style of folding the operating section 21 outward can also be achieved. A method of using the folding portable terminal 1 of this embodiment is the same as those of the first embodiment and the second embodiment.

According to the present invention, since the folding portable terminal can be closed with the display section exposed to the outside, the sub-display section, the sub-camera, etc. are not needed, which is advantageous to reduce the terminal size and for the cost reason.

Since the folding portable terminal can be closed with the operating section exposed to the outside, an incoming call can be received or a phone call can be made while maintaining the closed state. When the terminal is closed with the operating section exposed to the outside, a user may accidentally operate the operating section. To prevent such operations, the terminal can be closed with only the operating section faced inward (and the display section faced outward or inward).

The folding portable terminal can be used as a table television, a table clock, etc., and if the terminal is equipped with a rotation camera, a videophone call, etc., can be made while the folding portable terminal is put on a pedestal. When the operating section case of the folding portable terminal is put on the pedestal, since the operating section case can be put on the pedestal with the operating section faced upward in an operable manner, various operations such as an incoming call, a phone call and operations for switching a channel can be performed while keeping the folding portable terminal on the pedestal.

The invention claimed is:

1. A folding portable terminal having an operating section case with an operating section and a display section case with a display section that are foldably linked by a hinge mechanism, the hinge mechanism comprising: a first hinge section that disposes in an approximately center portion of the display section case a first rotation axis for rotating the display section case in the folding or opening direction relative to the operating section case; a second hinge section that disposes in an approximately upper end portion of the operating section case a second rotation axis for rotating the operating section case in the folding or opening direction relative to the display section case in parallel with the first rotation axis; and linking means for linking both ends of the first rotation axis and both ends of the second rotation axis, respectively, the folding portable terminal being able to be folded by the hinge mechanism such that the display section is not opposed to the operating section.

2. The folding portable terminal of claim 1, wherein either or both of the display section and the operating section can be folded outward.

3. The folding portable terminal of claim 1 or 2, wherein the operating section case comprises imaging means on a surface provided with the operating section.

4. The folding portable terminal of claim 1 or 2, wherein the operating section case comprises imaging means on a surface behind the surface provided with the operating section.

5. The folding portable terminal of claim 1 or 2, wherein the operating section case comprises imaging means that can be rotated in the direction of folding or opening the display section case relative to the operating section case on an upper end portion.

6. The folding portable terminal of claim 1 or 2, wherein the display section case comprises imaging means that can be rotated in the direction of folding or opening the display section case relative to the operating section case.

7. The folding portable terminal of claim 1 or 2, comprising operating means for operating the folding portable terminal on a side face of the operating section case or the display section case.

* * * * *